United States Patent [19]  
Babunovic et al.

[11] 3,981,389  
[45] Sept. 21, 1976

[54] TANDEM BOTTLE CARRIER ASSEMBLY
[75] Inventors: Momir Babunovic, Des Peres; John C. Kay, Spanish Lake, both of Mo.
[73] Assignee: Barry-Wehmiller Company, St. Louis, Mo.
[22] Filed: Dec. 20, 1974
[21] Appl. No.: 534,759

[52] U.S. Cl................................ 198/655; 224/45 A
[51] Int. Cl.² ......................................... B65G 17/00
[58] Field of Search .......... 198/645, 646, 655, 656, 198/131, 175; 224/45 A, 45 AA, 45 AB, 45 BA

[56] References Cited
UNITED STATES PATENTS

| | | | |
|---|---|---|---|
| 1,313,706 | 8/1919 | Loew et al. | 198/131 X |
| 1,511,221 | 10/1924 | Joy | 198/175 X |
| 2,580,599 | 1/1952 | Rogers | 198/131 X |
| 2,878,920 | 3/1959 | Rayman | 198/131 |
| 3,150,765 | 9/1964 | Ellis | 198/131 |
| 3,344,904 | 10/1967 | Kocián | 198/131 |

*Primary Examiner*—Evon C. Blunk  
*Assistant Examiner*—Douglas D. Watts  
*Attorney, Agent, or Firm*—Gravely, Lieder & Woodruff

[57] ABSTRACT

A tandem bottle carrier assembly in which the carrier is provided with two rows of pockets to support bottles in tandem in the direction of travel and the roller chain has a pitch which relates one link and a pair of rollers for each end of each carrier with means to attach the links to the carrier ends for accommodating chain stretch and minimum chord line displacement at turns in the chain travel.

3 Claims, 6 Drawing Figures

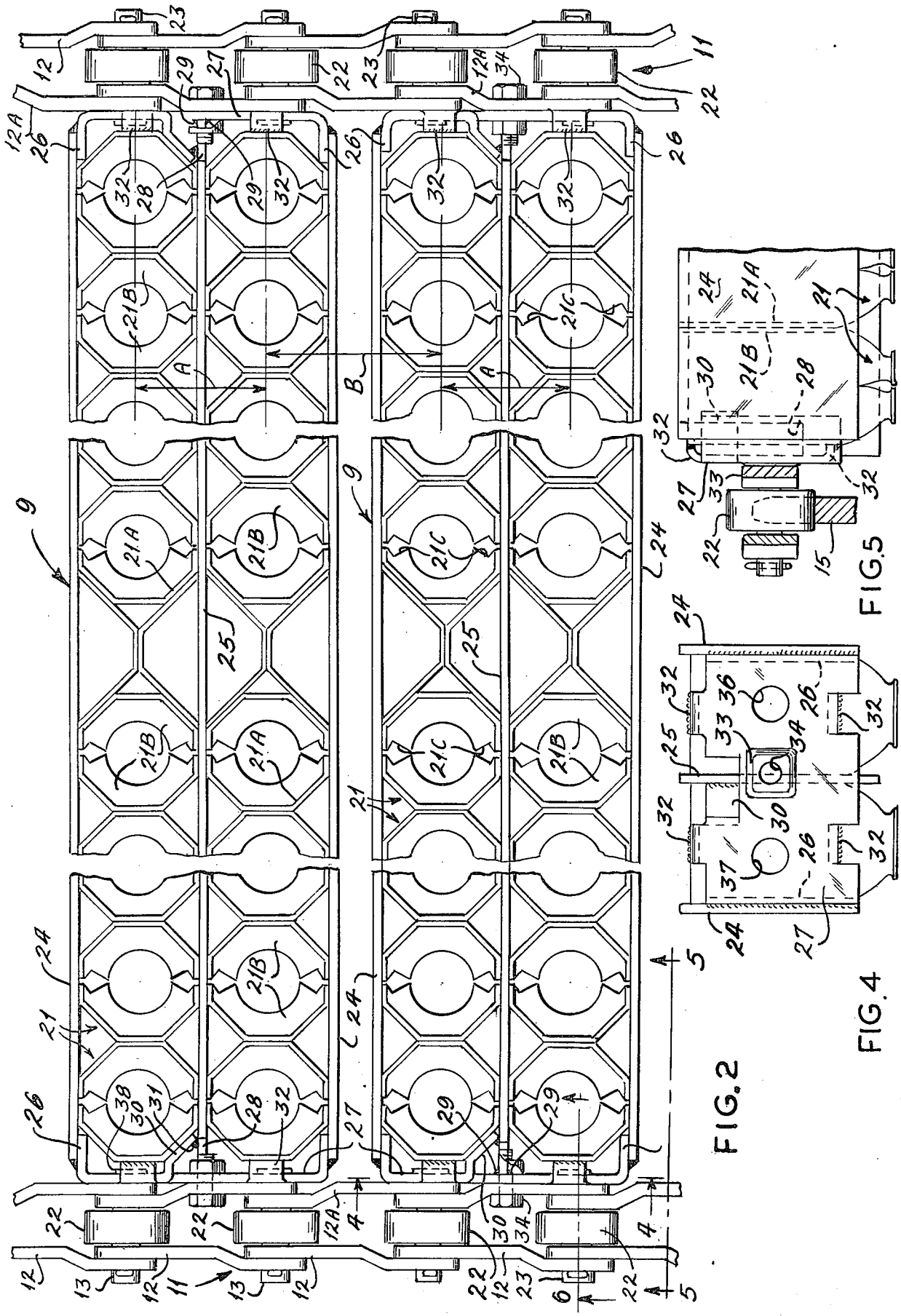

TANDEM BOTTLE CARRIER ASSEMBLY

BRIEF SUMMARY OF THE INVENTION

This invention relates to improvements in the assembly and operation of roller chain and bottle carriers for washers, and in particular to an assembly of tandem bottle carriers and roller chain drives therefor.

The problems with high capacity bottle washing machines are that as speed increases the life of the driving components decreases, and the larger the machines get the greater the cost for initial purchase and subsequent repair. Some attempts to obtain greater capacity have involved putting two machines together and providing a common discharge. Other attempts have involved very wide single machines with provisions for incorporating supports in the central part of the machines. Still others have involved staggered double row carriers which make the discharge mechanism extremely expensive and costly to maintain, and introduces serious bottle handling problems at both the loading and discharging ends.

The present invention achieves increased capacity without changing the regular flow of bottles in files so that loading and unloading does not involve the problems raised by staggered double row carriers. In order for bottles to be smoothly and easily loaded and discharged the carrier must not sag or twist otherwise the pockets can become distorted. Strength and resistance to sag and twist is obtained by arranging all of the components to cooperate and contribute to the strength of the whole assembly.

This invention also achieves increase in capacity by constructing a bottle carrier with a tandem arrangement of pockets which uses a pair of rollers and suitable links in the roller chain at each end to support the carrier, the connection of the rollers and links retaining the chain pitch values of conventional chains and providing the least deviation of the carrier from the circular path of travel of the rollers.

It is an important object of this invention to arrange the bottle carriers between spaced propelling link chains and to establish the propelling connection for travel of the carriers along curved paths by having headed pins which articulate the chain links received in bottle carrier end members such that the end members are related with a pair of headed pins having a spacing which establishes a chordal characteristic for the links when traversing the curved paths and brings the path of travel of the links very nearly into coincidence with the segments of the true pitch circle for the curvature of the path being traversed by any two pins.

Another object of this invention is directed to improvements in a tandem carrier and roller chain assembly for bottle washers comprising a carrier structure having spaced side and center plates, bottle carrying pockets secured to opposite sides of the center plate and to said side plates to constitute the web of a beam assembly; end plates secured to the opposite ends of said side and center plates, said end plates having recesses therein substantially symmetrically spaced on each side of said center plate; drive chains for said carrier structure comprising rollers and links embracing said rollers and roller pins extending through said links and rollers, said roller pins having headed ends adapted to seat in said end plate recesses and exert a driving force on said carrier; and means releasibly retaining said drive chain and carrier end plates in operative connection.

BRIEF DESCRIPTION OF THE DRAWINGS

The presently preferred embodiments of the invention is illustrated in the drawings, wherein:

FIG. 2 is a fragmentary elevational view of portions of a pair of tandem bottle carriers showing the structure thereof, the view being seen along lines 2—2 in FIG. 1 without the bottles;

FIG. 4 is an end view of a tandem carrier taken along lines 4—4 in FIG. 2;

FIG. 5 is a fragmentary sectional view of a side of the tandem carrier seen in FIG. 2, the view being taken along lines 5—5 in FIG. 2.

DESCRIPTION OF THE EMBODIMENTS

Figure 1:
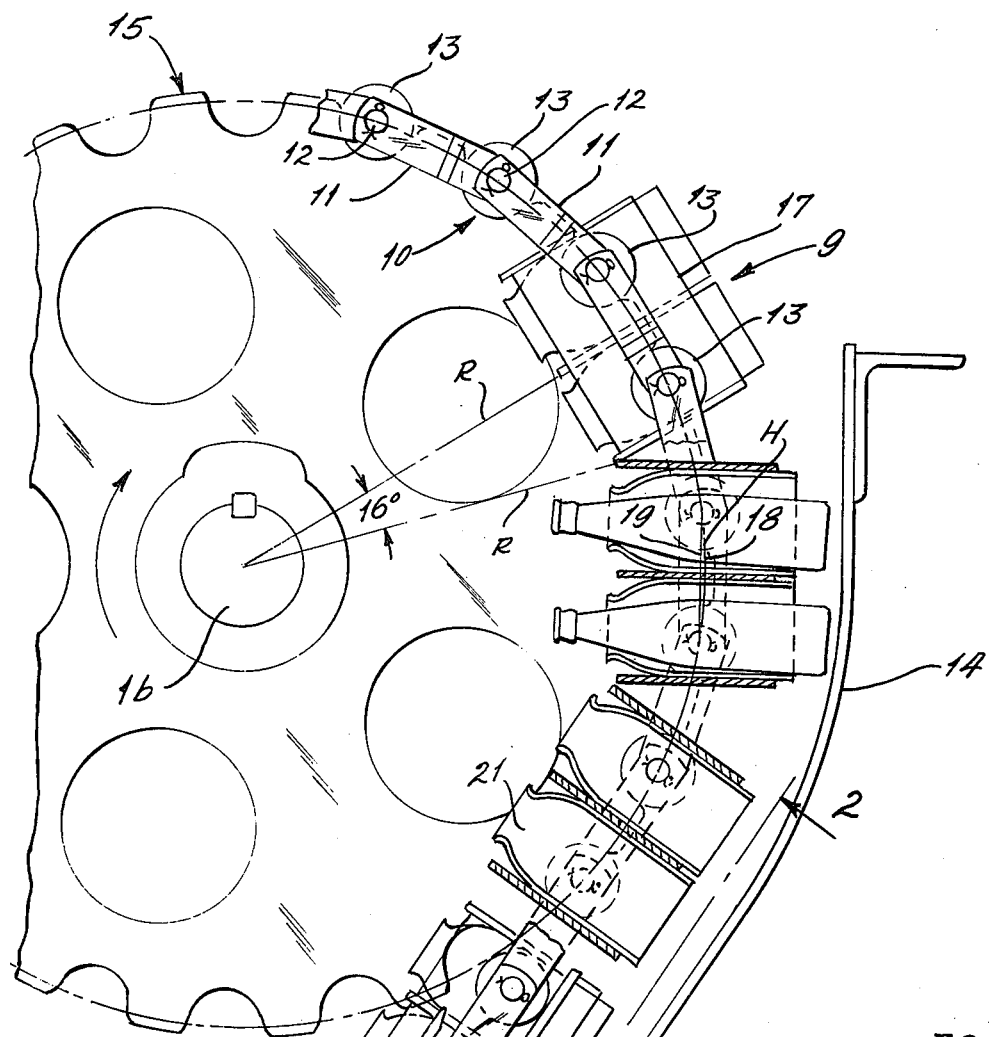
FIG. 1 is a schematic diagram of the tandem bottle carrier assembly supported by a link and roller chain and moving about a sprocket wheel in cooperation with bottle retaining guide.
Figure 6:
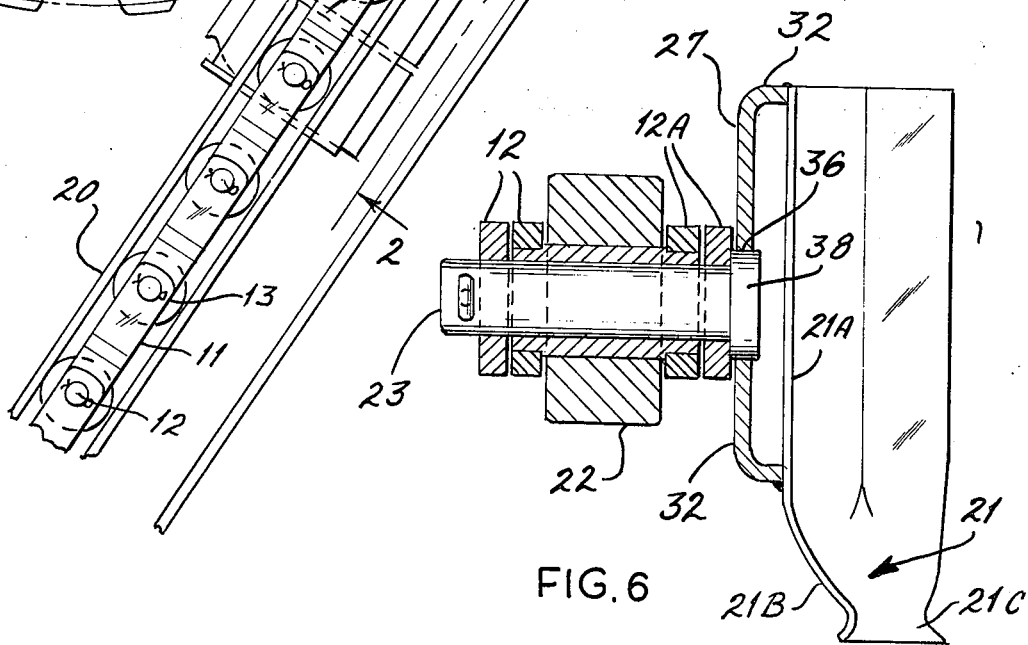
FIG. 6 is a detail view of a typical operative connection between the roller chain pin head and the adjacent portion of the carrier assembly, the view being taken at lines 6—6 in FIG. 2.

FIG. 1 illustrates a number of especially novel and important features of the invention. It is to be observed that the tandem bottle carrier assembly 9 is operatively carried by a pin connected link and roller chain 10 such that there is a chain link 11 and a pair of pins 12 and rollers 13 opposite the end of each carrier 9, thereby holding the chain to a substantially minimum distance between rollers. As there are now two rollers 13 for each end of the bottle carrier 9 the stability of the carrier is enhanced and it may have a much more uniform spacing from the bottle retainer or guide means 14 as the chain is carried around the sprocket wheel 15 mounted on shaft 16. More specifically, it is seen in FIG. 1 that the rollers 13 have fixed positions relative to the end members or plates 17 of the carriers 9. This establishes a chordal characteristic for any two pins 12 that deviates from the circular segment or arc of the pitch circle for the sprocket wheel 15 by the distance H which may be referred to as the heighth of the middle ordinate or circular segment 18 from the chord 19. When the middle ordinate H is a minimum, the series of circular segments 18 and the path of travel of the carrier 9 very nearly coincide. As a consequence, the bottle retainer means or guide 14 can be formed most easily to hold a substantially constant distance or spacing from the carrier for both straight and curved paths.

The advantage of the assembly of FIG. 1 is that a variety of different heighth bottles may be carried with the same carrier, so long as the necks of the bottles in two adjacent carriers do not cross the area depicted by the ray lines R forming the angle of 16 degrees. That does not means that bottle size is to be mixed during any one operation of the apparatus. As the chain 10 moves from the sprocket 15 into a straight pass the rollers 13 are engaged in a track 20 which prevents vibration or flutter of the carriers. This assembly arrangement may be employed without particular regard to the specific construction of the bottle pockets in the carrier but is important in effecting the operative connection with a tandem carrier.

FIGS. 2 to 6 disclose one embodiment of link and roller chain drive for a tandem carrier which will satisfy the principles of operation set forth. Such an arrangement is capable of handling a great capacity of bottles at reasonable speeds and minimum wear and strain on the propelling chains. Thus, capacity increase is obtained while minimizing the chance for loss of service life. The structure is shown generally in FIG. 2 where a pair of carriers 9 are shown in front elevation and the direction of travel is down. The carriers 9 are operatively connected between roller chains 10 in which rollers 22 are mounted on axle pins 23 and are located between the ends of chain links 12 on the outside and other links 12A on the inside. The inside links 12A have a modified shape for a purpose to appear.

Figure 3:
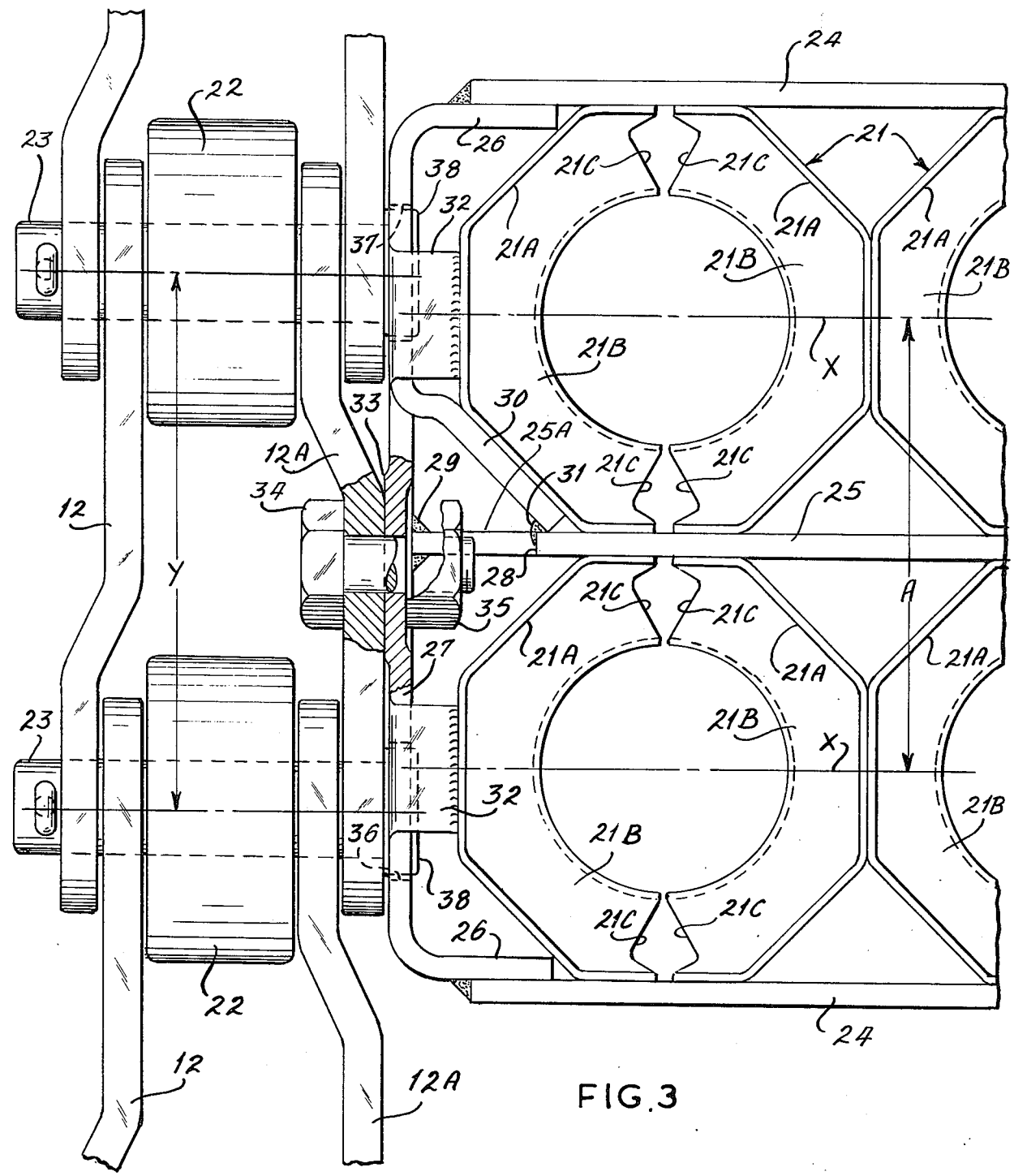
FIG. 3 is a greatly enlarged and fragmentary view of the structure seen in the left end portion of FIG. 2 to show the details of the carrier and chain assembly.

In the embodiment shown in FIGS. 2, 3 and 4, each carrier 9 is constructed of spaced apart longitudinal side plates 24 and a central longitudinal plate 25. The opposite ends of the side plates are secured (welded) to the inturned flanges 26 on end members or plates 27. The central plate is longer than the side plates 24 and is formed at each end with a notch 28 (FIG. 3) and only a portion 25A at the end of the plate extends into abutment with the inner surface of the respective end plates 27. The abutting ends are secured, as by welding at 29. The center plate is also secured to the end plates 27 by a tab 30 being bent inward from the end plates 27 and welded at 31 to the edge of the notch 28. In addition to the securing of the end plates 27 to the side and center longitudinal plates, the side and center plates are held in spaced relation by the placement of the bottle pockets 21 is made up of identical half skirt sections 21A, each half section having a skirt formed with three flat surfaces and portions of two other surfaces so that the flat surfaces have inside angles of 135° to form an octagonal pocket. The skirts have necked down end surfaces 21B which are formed along the edges with notches 21C for the purpose of allowing fluid to pass in and out around the neck of the bottles.

The structure of the carrier 9 is that of a load carrying beam in which the side plates 24 are held in spaced relation by a web made up of the sections of the pockets 21, together with the center plate 25. The plates 24 and 25 furnish the necessary strength to support the load when in the vertical position (90° from that shown in FIG. 2), and the pockets 21 act to furnish the strength to keep the plates 24 and 25 from bending or flexing when in the horizontal positions seen in FIG. 2. A carrier made up of the components above described, and with the pocket sections welded to each other and to the respective plates 24 and 25, can be made up in lengths to carry many more bottles than is possible with current carriers and rigidity can be maintained within requirements for apparatus of this character. It is observed in FIGS. 2, 3 and 4 that each end plate 27 is formed with upper and lower tabs 32 which are bent inwardly and welded to the adjacent flat surfaces of the pocket skirts 21A.

The views of FIGS. 2, 3 and 5 show the operative connection of the tandem carriers 9 to the link and roller chains 10. As noted before the chain links 12A have a shape different from the outside links 12 due to the need to present a portion of the links 12A against a slightly outwardly embossed area 33 (FIG. 3) formed in the end plates 27 in the area of the notches 28 in the ends of the center plate 25. An aperture is formed in the embossment to receive a threaded bolt 34 inserted from the outside of link 12A, and a nut 35 is threaded up on the bolt to retain the carrier end plate 27 on the link 12A and establish a tension type connection. The propelling effort on the carriers 9 from the two end chains 10 is obtained by forming apertures 36 and 37 (FIG. 3) in each end plate 27. Aperture 36 receives in close fitted relation the headed end 38 of the leading pin 23 (FIG. 6), thereby exerting the primary propelling force. The apertures 37 in the end plates 27 trail the apertures 36, and the trailing pin heads 38 have a loose fit to accommodate chain stretch, but the pair of pin heads 38, as well as the bolt 34, retain the carrier end plates 27 in proper alignment and in stable positions during traverse of the chains 10 around the turns of the sprockets, like sprocket 15.

The unique features of the present carrier and chain drive are found in the cooperation obtained from all components of the carriers 9 to give the bottles a substantially sag and torque free support, in the arrangement of the drive chain 10 for connection to the carrier end plates 27 such that the chain links 12 and 12A can be as short as possible to hold the heighth H of the middle ordinate or circular segments of the chain when traversing a sprocket to a minimum, and to arrange the drive connection between the chains and the carriers for long service life by avoiding strain and friction in the critical areas. The present carrier is capable of increasing the capacity to move bottles and containers by resort to tandem alignment and by devising a substantially rigid carrier that has the capacity to operate at lengths which will obtain capacity without going to higher speeds.

In providing a tandem carrier it is appreciated that the width of the carrier in moving about a curved path forms a chord for the arc of the curve and the carrier thus moves inside the true arc. This means that the usual arrangement of locating the drive chain rollers between carriers, instead of within the carrier width as here, will result in the carriers deviating inwardly an excessive amount from a true circular or curved path. Since stationary guides are necessary to hold the bottles in the carrier pockets, it is detrimental to have a large deviation or separating movement between the carriers and the guides. That is to say, it is undesirable to have the carriers move inwardly away from the guides as they traverse a curved path and then move back to a fixed distance when the path becomes straight. In the present instance, the objectional movement of the carrier relative to the fixed guide is avoided by being able to locate the drive chain roller links on the ends of the carrier and having the roller pin heads engaged in the carrier end members within the width dimension of the carrier. The good effect of this arrangement is to keep the chordal length of the chain links as short as possible so that the links follow closely the curved path of the rollers. This arrangement keeps the dimension of the middle ordinate or circular segment heights H small. This dimension H gets smaller as the diameter of the sprocket 15 gets larger. For small diameter sprockets, the middle ordinate dimension is quite important as it tends to increase because the chordal spacing of the rollers increases.

Referring again to FIGS. 2 and 3, it is shown that the center to center distance A of the rows of pockets 21 in each carrier 9 is less than the distance B between the centers of the rows of pockets 21 in adjacent carriers 9. This dimensional arrangement is achieved without affecting the uniform spacing of the rollers 13 in the propelling chains 10 by having the center lines X of the rows of pockets 21 (FIG. 3) in each tandem carrier closer together than the roller spacing Y. This relationship, where the distance A is less than distance Y, facilitates the discharge, as in each case the timing of the loading and unloading means is much easier to accomplish.

The foregoing description has set forth a novel assembly of tandem bottle carriers and link and roller propelling chains which will traverse an arcuate path with minimum middle ordinate deviation from a true segment of arc, thereby allowing the carriers to handle a variety of lengths of bottles without danger of bottle escape or jamming between the pockets and the stationary guides which normally hold the bottles in the pockets. When the middle ordinate dimension is held to a minimum the motion of the bottle pockets away from the stationary guides is held to a minimum also, and the travel of the pockets around a curved path, such as is defined by a sprocket, deviates little from the travel along a straight path. The result is a more uniform spacing between pocket and fixed guide in both straight and curved paths.

What is claimed is:

1. In a tandem bottle carrier assembly for bottle washers the improvement which comprises a pair of roller chains in spaced parallel relation, said chains including a series of rollers, a series of links interconnecting said rollers at least on one side of the rollers, said links having overlapped ends; pin means extending through each of said rollers and engaged in said overlapped ends of adjacent ones of said links, said pins having heads thereon in opposed facing relation between said pair of chains; elongated carrier means extending between said pair of roller chains, each of said carrier means including two series of bottle receiving pockets spaced widthwise of said carrier means in tandem formation, and an end member on the opposite ends of the said carrier, said end members being formed with recesses spaced widthwise of said carrier means in the direction of chain travel with the trailing recess being elongated generally in the direction of travel to accommodate chain stretch; means securing each end member to the adjacent roller chain at an adjacent one of the links between a pair of adjacent overlapped ends of said links and with said pin heads disposed within said recesses of each end member; and the leading recesses of said end members and one of said pin heads being engaged in driving relation, said pins and end member recesses being spaced apart a distance less than the width of said carrier means.

2. A tandem bottle carrier which comprises spaced apart elongated side plates extending parallel to each other, an elongated center plate dividing the space between said side plates into two smaller elongated spaces, a series of bottle supporting pockets in each elongated space, each pocket of said series having a skirt portion with flat surfaces and a tapering end portion, means securing certain of said skirt flat surfaces of each pocket to a flat surface of an adjacent pocket and to said side and center plates, and end members for the opposite ends of said carrier, each end member being formed with marginal flanges and spaced tabs and said flanges and tabs of each said end member being secured to said side plates, center plate and adjacent pockets respectively.

3. The tandem bottle carrier set forth in claim 2 wherein said side and center plates have a width dimension normal to the elongation thereof and of an extent greater than the flat skirt surfaces of said pockets.

* * * * *